US012610206B2

(12) United States Patent
Li et al.

(10) Patent No.: US 12,610,206 B2
(45) Date of Patent: Apr. 21, 2026

(54) GENERATING CHANNEL AND OBJECT-BASED AUDIO FROM CHANNEL-BASED AUDIO

(71) Applicants: Dolby Laboratories Licensing Corporation, San Francisco, CA (US); DOLBY INTERNATIONAL AB, Dublin (IE)

(72) Inventors: Xu Li, Beijing (CN); Giulio Cengarle, Barcelona (ES); Qingyuan Bin, Beijing (CN); Michael Getty Horgan, Brewster, MA (US)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 112 days.

(21) Appl. No.: 18/704,402

(22) PCT Filed: Oct. 14, 2022

(86) PCT No.: PCT/US2022/046641
§ 371 (c)(1),
(2) Date: Apr. 24, 2024

(87) PCT Pub. No.: WO2023/076039
PCT Pub. Date: May 4, 2023

(65) Prior Publication Data

US 2025/0126428 A1 Apr. 17, 2025

Related U.S. Application Data

(60) Provisional application No. 63/298,673, filed on Jan. 12, 2022.

(30) Foreign Application Priority Data

Oct. 25, 2021 (ES) ................................ P202130998
Jan. 18, 2022 (EP) .................................... 22151947

(51) Int. Cl.
*H04S 7/00* (2006.01)

(52) U.S. Cl.
CPC ................ *H04S 7/302* (2013.01); *H04S 7/30* (2013.01); *H04S 2400/11* (2013.01); *H04S 2400/13* (2013.01)

(58) Field of Classification Search
None
See application file for complete search history.

(56) References Cited

U.S. PATENT DOCUMENTS 6,167,404 A 12/2000 Morcos
9,165,558 B2 10/2015 Dressler
(Continued)

FOREIGN PATENT DOCUMENTS

EP 3465678 A1 4/2019

OTHER PUBLICATIONS

Benjamin Guy Shirley, "Improving Television Sound for People with Hearing Impairments", Ph.D Thesis, Acoustics Research Centre, School of Computing, Science and Engineering, College of Science and Technology, University of Salford, Salford, UK, Dec. 2013, 222 Pages.

(Continued)

*Primary Examiner* — Antim G Shah

(57) ABSTRACT

A method of audio processing includes generating a detection score based on the partial loudnesses of a reference audio signal, extracted audio objects, extracted bed channels, a rendered audio signal and a channel-based audio signal. The detection score is indicative of an audio artifact in one or more of the audio objects and the bed channels. The extracted audio objects and extracted bed channels may be modified, in accordance with the detection score, to reduce the audio artifact.

20 Claims, 5 Drawing Sheets

(56) References Cited

U.S. PATENT DOCUMENTS

| | | | | |
|---|---|---|---|---|
| 9,756,445 | B2 | 9/2017 | Wang | |
| 9,794,718 | B2 | 10/2017 | Crockett | |
| 10,275,685 | B2 | 4/2019 | Hu | |
| 2016/0150343 | A1 * | 5/2016 | Wang | H04S 3/002 381/103 |
| 2017/0098452 | A1 | 4/2017 | Tracey | |
| 2017/0215019 | A1 * | 7/2017 | Chen | G10L 21/038 |
| 2019/0052991 | A9 * | 2/2019 | Wang | H04S 7/308 |
| 2020/0126570 | A1 | 4/2020 | Mehta | |
| 2020/0322743 | A1 | 10/2020 | Cengarle | |

OTHER PUBLICATIONS

Joao Martins, "Object-Based Audio and Sound Reproduction", https://audioxpress.com/article/object-based-audio-and-sound-reproduction, Apr. 26, 2018, 12 Pages.

Philip Coleman, et al. "An Audio-Visual System for Object-Based Audio: From Recording to Listening", Located Via: ProQuest (Technology Collection Database, Dissertations and Theses Database): Technical Literature Search, In IEEE Transactions on Multimedia, vol. 20, No. 8, Aug. 2018, pp. 1919-1931, 13 Pages.

* cited by examiner

GENERATING CHANNEL AND OBJECT-BASED AUDIO FROM CHANNEL-BASED AUDIO

CROSS REFERENCE TO RELATED APPLICATIONS

This application is a National Phase entry of PCT Patent Application No. PCT/US2022/046641, filed Oct. 14, 2022, which claims priority of the following priority application: ES patent application P202130998 (reference: D20067ES), filed 25 Oct. 2021 and U.S. provisional application 63/298,673 (reference: D20067USP1), filed 12 Jan. 2022, all of which are incorporated herein by reference in their entirety.

FIELD

The present disclosure relates to audio processing, and in particular, to generating object-based audio from channel-based audio.

BACKGROUND

Unless otherwise indicated herein, the approaches described in this section are not prior art to the claims in this application and are not admitted to be prior art by inclusion in this section.

Recently in the multimedia industry, three-dimensional (3D) movies and television contents are getting more and more popular in cinema and home. Several audio reproduction systems have also been proposed to follow these developments. Conventional multichannel systems such as stereo audio e.g. 2-channels, 5.1-channel surround sound, 7.1-channel surround sound, etc. have been extended to create a more immersive sound field.

An example of a next-generation audio system is a format that includes both audio channels, referred to as bed channels, and audio objects. Audio objects refer to individual audio elements that exist for a defined duration in time and have metadata such as spatial information describing the position, velocity, and size of the audio object. Bed channels refer to audio channels that are to be reproduced in pre-defined, fixed speaker locations. During transmission, objects and bed channels can be sent separately, and then used by a reproduction system to recreate the artistic intent adaptively, based on the specific configuration of playback speakers in the reproduction environment: the generation of the audio output based on the configuration of the speakers may be referred to as rendering.

SUMMARY

One issue with existing audio processing systems is that the majority of existing audio content is channel-based, such as 5.1, 7.1 or stereo. In order to convert traditional channel-based content into channel- and object-based format, automated techniques or tools need to be developed to extract objects and bed channels from traditional mixes. Furthermore, automated rendering tools are also desired to further modify or upmix the extracted audio objects and bed channels, and to improve the reproduction of traditional content. In addition, there may be artifacts and inaccurate estimations introduced in the automatic object extraction and ambience upmixing process, so it is also desired to detect these issues in an automated manner and improve the quality of the final output content. Embodiments are directed to evaluating the statistics of the extracted audio objects and bed channels to identify discontinuities, and to adjusting the extracted audio objects and bed channels as needed in order to reduce the discontinuities. This automatic evaluation and adjustment is an improvement over traditional methods that may require extensive manual evaluation and manipulation by an audio engineer.

Embodiments use audio signal processing techniques to automatically convert an arbitrary multi-channel audio content, e.g., 5.1, 7.1, etc., from a channel-based format to a channel- and object-based format. To improve the quality of the channel- and object-based audio content, the system implements three modules: (1) a control module that verifies and evaluates the results of the object extraction and rendering module; (2) an adaptive post-processing module, based on the results of the control module, to obtain the post-processing parameters; and (3) a modification module, based on the obtained post-processing parameters, to modify the extracted channel- and object-based audio content.

According to an embodiment, a computer-implemented method of audio processing includes receiving a channel-based audio signal, generating a reference audio signal based on the channel-based audio signal, and generating a plurality of audio objects and a plurality of bed channels based on the channel-based audio signal. The method further includes generating a rendered audio signal based on the plurality of audio objects and the plurality of bed channels. The method further includes generating a detection score based on a plurality of partial loudnesses of a plurality of signals. The plurality of signals includes the reference audio signal, the plurality of audio objects, the plurality of bed channels, the rendered audio signal and the channel-based audio signal. The detection score is indicative of an audio artifact in one or more of the plurality of audio objects and the plurality of bed channels. The method further includes generating a plurality of parameters based on the detection score. The method further includes generating a plurality of modified audio objects and a plurality of modified bed channels based on the channel-based audio signal, the plurality of audio objects, the plurality of bed channels and the plurality of parameters.

As a result, the modified audio objects and the modified bed channels have reduced audio artifacts as compared to the unmodified audio objects and unmodified bed channels.

According to another embodiment, an apparatus includes one or more loudspeakers and a processor. The processor is configured to control the apparatus to implement one or more of the methods described herein. The apparatus may additionally include similar details to those of one or more of the methods described herein.

According to another embodiment, a non-transitory computer readable medium stores a computer program that, when executed by a processor, controls an apparatus to execute processing including one or more of the methods described herein.

The following detailed description and accompanying drawings provide a further understanding of the nature and advantages of various implementations.

DETAILED DESCRIPTION

Described herein are techniques related to audio processing. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps, even if those steps are otherwise described in another order, and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted, e.g. "either A or B", "at most one of A and B", etc.

This document describes various processing functions that are associated with structures such as blocks, elements, components, circuits, etc. In general, these structures may be implemented by a processor that is controlled by one or more computer programs.

Figure 1:
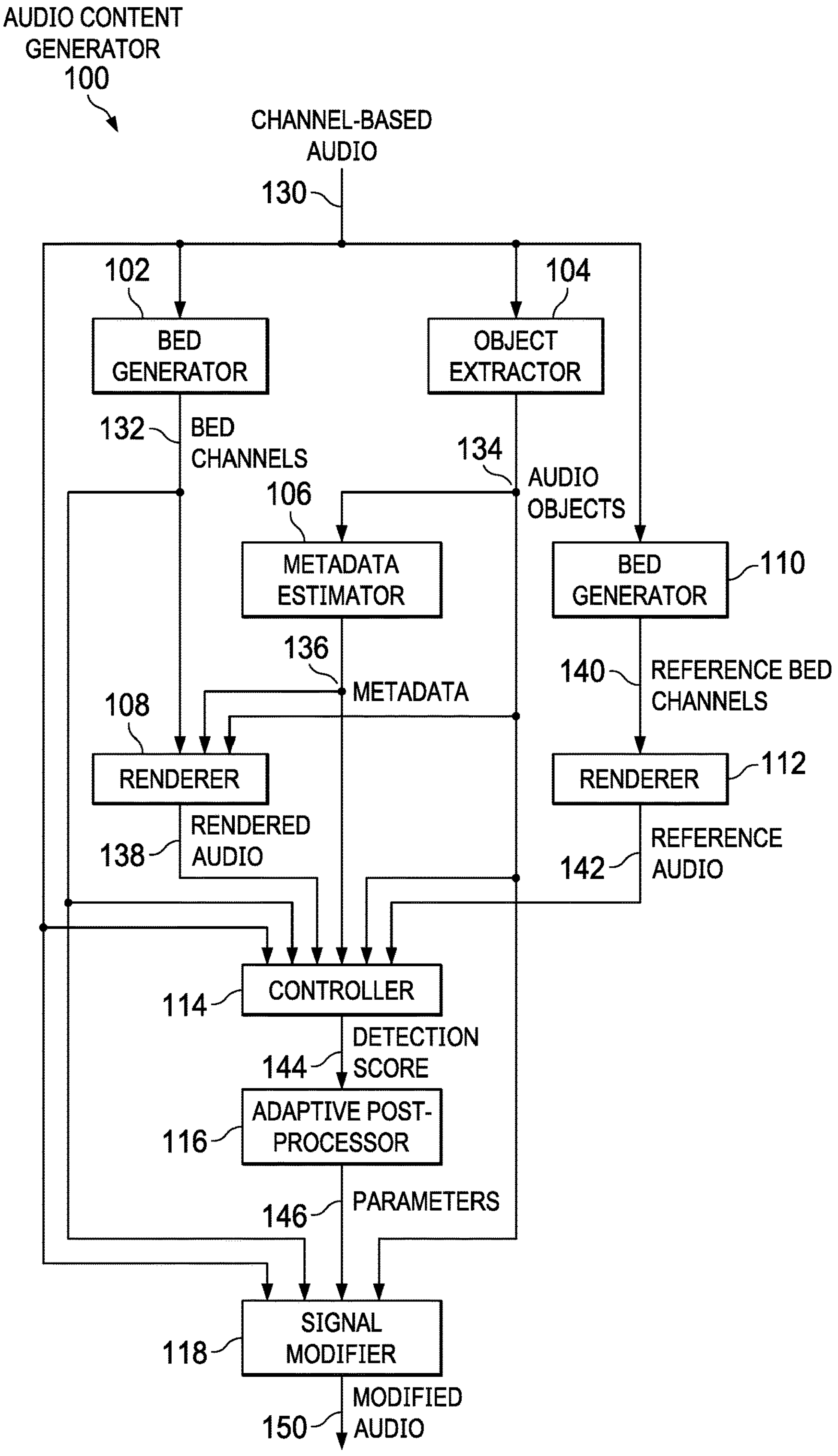
FIG. 1 is a block diagram of an audio content generator 100.

FIG. 1 is a block diagram of an audio content generator 100. The audio content generator 100 generally transforms an input channel-based audio signal 130 into an output audio signal 150 that includes audio objects, e.g. a channel- and object-based audio signal, also referred to as the modified audio signal 150. The channel-based audio signal 130 generally corresponds to a multi-channel audio signal such as a stereo signal e.g. 2 channels, a 5.1-channel surround signal, a 7.1-channel surround signal, etc. The channel-based audio signal 130 generally includes a number of audio samples, e.g. each channel has a number of samples. The audio samples may be arranged into blocks. As further detailed herein, the audio content generator 100 operates on a per-block basis, where each block has a duration of between 0.20 and 0.30 seconds. According to a specific embodiment, the block size is 0.25 seconds; this value produces reasonable results for a listener and may be adjusted as desired. The channel-based audio signal 130 may have a sample rate of 48 kHz, in which case the block size of 0.25 seconds results in approximately 12,000 samples per block. The output audio signal 150, also referred to as the modified audio signal 150, generally results from converting and modifying the channel-based audio signal 130 as further detailed herein.

The components of the audio content generator 100 may be implemented by one or more processors that are controlled by one or more computer programs. The audio content generator 100 includes a bed generator 102, an object extractor 104, a metadata estimator 106, a renderer 108, a bed generator 110, a renderer 112, a controller 114, an adaptive post-processor 116, and a signal modifier 118. The audio content generator 100 may include other components that, for brevity, are not detailed herein.

The bed generator 102 receives the channel-based audio signal 130, performs bed generation, and generates one or more bed channels 132 based on the channel-based audio signal 130. In general, bed channels contain audio signal components represented in a channel-based format, and each of the bed channels corresponds to sound reproduction at a pre-defined, fixed location. The bed channels may include bed channels for directional audio signals, also referred to as direct signals, and bed channels for diffusive audio signals, also referred to as diffuse signals. The direct signals correspond to audio that is to be perceived as originating at a defined location or from a defined direction. The diffuse signals correspond to audio that is not to be perceived as originating from a defined direction, for example to represent relatively complex audio textures such as background or ambiance sounds in the sound field for efficient authoring and distribution. Specifically, the bed channels 132 correspond to the diffuse signals generated based on the channel-based audio signal 130. The bed channels 132 may include one or more height channels.

The object extractor 104 receives the channel-based audio signal 130, performs audio object extraction, and generates one or more audio objects 134 based on the channel-based audio signal 130. Each of the audio objects 134 corresponds to audio data and metadata, where the metadata indicates information such as object position, object size, object velocity, etc.; the output system uses the metadata to output the audio data in accordance with the specific loudspeaker arrangement at the output end. This may be contrasted with the bed channels 132, which have each bed channel specifically associated with one or more loudspeakers. The metadata is discussed in more detail with reference to the metadata estimator 106.

The object extractor 104 may include a signal decomposer that is configured to decompose the channel-based audio signal 130 into a directional audio signal and a diffusive audio signal. In these embodiments, the object extractor 104 may be configured to extract the audio object from the directional audio signal. In some embodiments, the signal decomposer may include a component decomposer and a probability calculator. The component decomposer is configured to perform signal component decomposition on the channel-based audio signal 130. The probability calculator is configured to calculate probability for diffusivity by analyzing the decomposed signal components.

Alternatively or additionally, the object extractor 104 may include a spectrum composer and a temporal composer. The spectrum composer is configured to perform, for each frame in the channel-based audio signal 130, spectrum composition to identify and aggregate channels containing the same audio object. A frame is a vector of a pre-defined number of consecutive samples, typically several hundreds, for each of the channels in the signal, at a given time. The temporal composer is configured to perform temporal composition of the identified and aggregated channels across a set of frames to form the audio object along time. For example, the spectrum composer may include a frequency divisor that is configured to divide, for each of the set of frames, a frequency range into a set of sub-bands. Accordingly, the spectrum composer may be configured to identify and aggregate the channels containing the same audio object based on similarity of at least one of envelop and spectral shape among the set of sub-bands.

The metadata estimator 106 receives the audio objects 134, performs metadata estimation, and generates metadata 136 based on the audio objects 134. The metadata 136 generally includes timestamps and positions, where the position may be given as (x, y, z) coordinates. The metadata estimator 106 may use panning-law inverting to perform the metadata estimation. To estimate the "x" position of a given audio object, the metadata estimator 106 may calculate the arctangent of the left to right energy ratio of the given audio object. To estimate the "y" position, the metadata estimator 106 may calculate the arctangent of the back to front energy ratio of the given audio object. To estimate the "z" position, the metadata estimator 106 may use the estimates of the "x" and "y" positions to compute a predefined function $z=f(x, y)$; in one embodiment, $f$ is a dome function that evaluates to z=1 when x and y are in the center of the loudspeaker layout, and evaluates to z=0 when x and y are on the boundaries of the loudspeaker layout.

The renderer 108 receives the bed channels 132, the audio objects 134 and the metadata 136, performs rendering, and generates a rendered audio signal 138 based on the bed channels 132, the audio objects 134 and the metadata 136. The rendered audio signal 138 is a channel-based audio signal, including one or more of a 5.1-channel signal, a 7.1-channel signal, a 5.1.4-channel signal, a 7.1.4-channel signal, etc. The rendered audio signal 138 may include two channel-based audio signals, one of which omits the ceiling channels. For example, the rendered audio signal 138 may include a 5.1.4-channel signal and a 5.1-channel signal, a 7.1.4-channel signal and a 7.1-channel signal, etc.

The bed generator 110 receives the channel-based audio signal 130, performs bed generation, and generates one or more reference bed channels 140. The reference bed channels 140 include bed channels for both the direct signals and the diffuse signals. In contrast, the bed channels 132 include only the diffuse signals. The bed generator 110 may be otherwise similar to the bed generator 102.

The renderer 112 receives the reference bed channels 140, performs rendering, and generates a reference audio signal 142 based on the reference bed channels 140. The reference audio signal 142 is a channel-based audio signal, including one or more of a 5.1-channel signal, a 7.1-channel signal, a 5.1.4-channel signal, a 7.1.4-channel signal, etc. In general, the reference audio signal will have a similar format to the format used for the rendered audio signal 138; for example, when the rendered audio signal 138 is a 5.1.4-channel signal and a 5.1-channel signal, the reference audio signal is a 5.1.4-channel signal. As compared to the rendered audio signal 138, the reference audio signal 142 is also rendered based on the channel-based audio signal 130; however, the reference audio signal 142 is rendered based on the bed channels, not on the audio objects or the metadata. The renderer 112 may be otherwise similar to the renderer 108.

The controller 114 receives the channel-based audio signal 130, the bed channels 132, the audio objects 134, the metadata 136, the rendered audio signal 138 and the reference audio signal 142, computes a number of signal metrics, and generates a detection score 144 based on the channel-based audio signal 130, the bed channels 132, the audio objects 134, the metadata 136, the rendered audio signal 138 and the reference audio signal 142. The signal metrics may be computed based on partial loudnesses of the signals. The detection score 144 is indicative of an audio artifact in one or more of the audio objects and the bed channels. For example, the bed channels 132 may have an audio artifact resulting from the particular operation of the bed generator 102; the audio objects 134 may have an audio artifact resulting from the particular operation of the object extractor 104; or both the bed channels 132 and the audio objects 134 may have audio artifacts. Further details of the controller 114 are provided with reference to FIG. 2.

Figure 2:
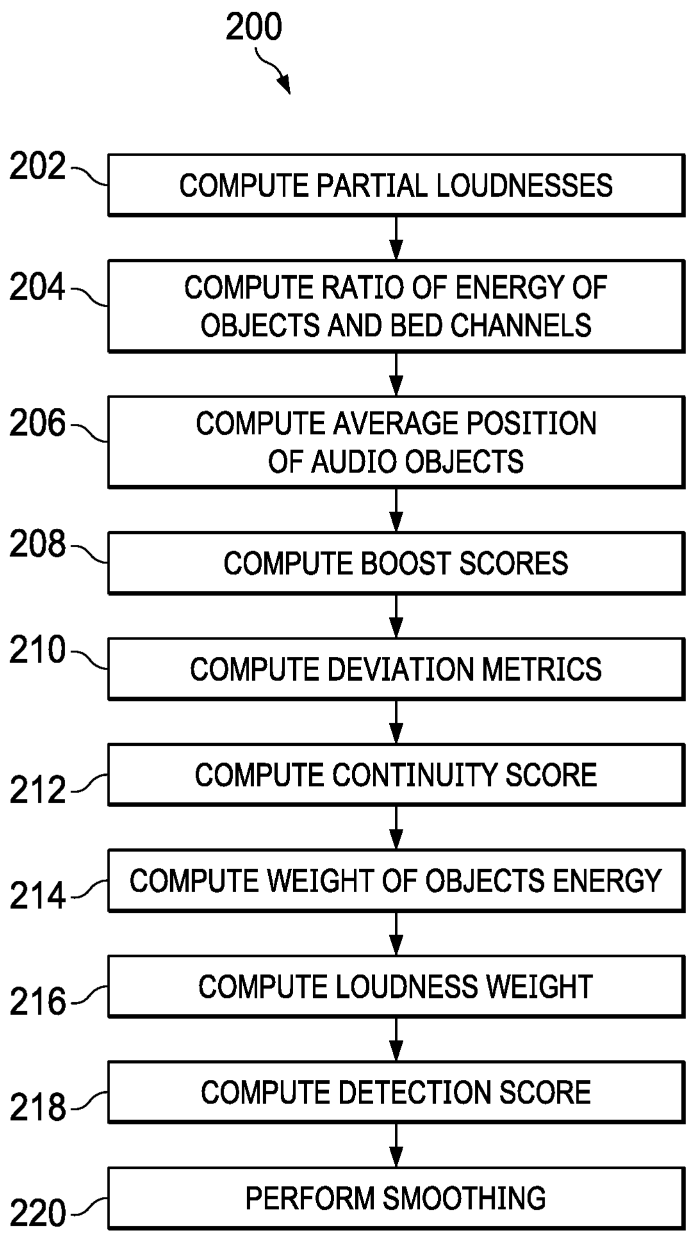
FIG. 2 is a flow diagram of a method 200 of audio processing.

FIG. 2 is a flow diagram of a method 200 of audio processing. The method 200 may be performed by the controller 114 (see FIG. 1), as implemented by one or more processors that may execute one or more computer programs. As discussed regarding the FIG. 1, the controller 114 receives four inputs. The first input is the audio objects 134, the bed channels 132 and the metadata 136, which are the outputs of the previous components. The audio objects 134 can be written as $x_{obj,i}$, where $i\in[1, \ldots, I]$ is the object index and I is the number of objects. The bed channels 132 can be written as $x_{bed,j}$, where $j\in[1, \ldots, B]$ is the bed channel index and B is the number of bed channels. The metadata can be written as $m_i$, where $i\in[1, \ldots, I]$ is the object index. The second input is the channel-based audio signal 130, which can be written as $x_{in}$. The third input is the rendered audio signal 138, which may include the rendered signal with ceiling channels, e.g. 5.1.4 or 7.1.4, and the rendered signal without ceiling channels, e.g. 5.1 or 7.1, which can be written as $X_{out}$ and $X_{out,f}$ respectively. The fourth input is the reference audio signal 142, which may be 5.1.4 or 7.1.4, and which may be written as $X_{ref}$. In general, the controller 114 uses the reference audio signal 142 to detect the quality of the rendered audio signal 138.

As discussed above, the audio content generator 100 (see FIG. 1) processes the channel-based audio signal 130 in a sequential, block-by-block manner. The block length L may be set as L=0.25 s. However, the block length can be modified as desired.

At 202, compute a number of partial loudnesses of the reference audio signal 142, also denoted as $X_{ref}$, the audio objects 134, also denoted as $x_{obj,i}$, the bed channels 132, also denoted as $x_{bed,j}$, the rendered audio signal 138, also denoted as $X_{out}$ and $X_{out,f}$, and the channel-based audio signal 130, also denoted as $X_{in}$; these partial loudnesses are respectively denoted as $x_{ref,ktc}$, $x_{obj,ikt}$, $x_{bed,jkt}$, $x_{out,ktc}$, $x_{out,f,ktc}$, and $x_{in,ktc}$, where $k\in[1, \ldots, K]$ is the frequency band index, K is the total number of frequency bands, t is the current block index, $c\in[1, \ldots, C]$ is the channel index, and C is the total number of channels. The loudnesses are computed due to the psychoacoustics of human hearing, in which the evaluation of loudness information is correlated with the evaluation of audio quality.

At 204, compute the ratio $r_t$ of the energy of objects with the energy of the objects and bed channels according to Equation (1):

$$r_t = \frac{\hat{x}_{obj,t}}{\hat{x}_{obj,t} + \hat{x}_{bed,t}} \tag{1}$$

In Equation (1), $\hat{x}_{obj,t}$ is the energy of the audio objects 134 and may be calculated according to Equation (2):

$$\hat{x}_{obj,t} = \sum_{i=1}^{C}\sum_{k=1}^{K} x_{obj,ikt}^2 \tag{2}$$

In Equation (1), $\hat{x}_{bed,t}$ is the energy of the bed channels 132 and may be calculated according to Equation (3):

$$\hat{x}_{bed,t} = \sum_{j=1}^{B}\sum_{k=1}^{K} x_{bed,jkt}^2 \tag{3}$$

In Equations (2) and (3), the variables t, i, C, k, K, j, B, k and K are as discussed above regarding 202. The energy of the audio objects 134 calculated in Equation (2) may be smoothed over time according to Equation (4):

$$\hat{x}_{obj,t} = \mu * \hat{x}_{obj,t-1} + (1-\mu) * \hat{x}_{obj,t} \tag{4}$$

The energy bed channels 132 calculated in Equation (3) may be smoothed overtime according to Equation (5):

$$\hat{x}_{bed,t} = \mu * \hat{x}_{bed,t-1} + (1-\mu) * \hat{x}_{bed,t} \tag{5}$$

In Equations (4) and (5), μ is the smoothing parameter, which is set as 0.7; this value may be adjusted as desired, for example to range between 0.6 and 0.8. For example, the user of the audio content generator 100 (see FIG. 1) can listen to the modified audio signal 150, perform an evaluation, adjust the smoothing parameter, and may continue iterative evaluation until the smoothing parameter produces acceptable results. $\hat{x}_{obj,0}$ and $\hat{x}_{bed,0}$ are initialized as zero.

In other words, the ratio $r_t$ is a ratio between a first energy and a second energy, where the first energy is the energy of the audio objects 134, and the second energy is the sum of the energy of the audio objects 134 and the energy of the bed channels 132. The ratio is calculated in order to determine the contribution of each object to the total energy.

At 206, compute the average position of each of the audio objects 134 in the block t based on the metadata 136. First, the metadata $m_{i,p}$ of each object i in the block t is obtained, where p is the time stamps in the block t, and $(t-1)*L \le p\ t*L$. Second, the average position $m_{i,t}$ of each object i in the block t is obtained according to Equation (6): (6)

$$m_{i,t} = \sum_{p} m_{i,p}/L$$

In Equation (6), L is the block length as discussed earlier. Third, the average position in the block t with the position in previous blocks is smoothed according to Equation (7):

$$m_{i,t} = \mu_m * m_{i,t-1} + (1-\mu_m) * m_{i,t} \tag{7}$$

In Equation (7), $\mu_m$ is the smoothing parameter. The smoothing parameter is adjustable, and generally ranges between 0.5 and 1.0; a typical value for the smoothing parameter is 0.7. For example, the user of the audio content generator 100 (see FIG. 1) can listen to the modified audio signal 150, perform an evaluation, adjust the smoothing parameter, and may continue iterative evaluation until the smoothing parameter produces acceptable results. In the first block, $m_{i,0}$ is set to zero. In other words, the average positions of the audio objects 134 are calculated in order to check for potential discontinuities between blocks for a given object.

At 208, compute a number of boost scores $score_{ij}$ based on the partial loudnesses, including the partial loudness $x_{in,ktc}$ of the channel-based audio signal 130, the partial loudness $x_{ref,ktc}$ of the reference audio signal 142, the partial loudness $x_{obj,ikt}$ of the audio objects 134, and the partial loudness $x_{out,ktc}$ and $x_{out,f,ktc}$ of the rendered audio signal 138. A final boost score $boost_{score}$ is computed based on selecting two or more of the boost scores; according to an embodiment, the two largest boost scores are summed to compute the final boost score. The full details of computing the final boost score $boost_{score}$ are as detailed in the following eight steps.

First, the sum of all the bands of the partial loudnesses, e.g., the signal energy, are calculated according to Equations (8.1, 8.2, 8.3, 8.4 and 8.5):

$$x_{obj,it} = \sum_{k=1}^{K} x_{obj,ikt} \tag{8.1}$$

$$x_{out,tc} = \sum_{k=1}^{K} x_{out,ktc} \tag{8.2}$$

$$x_{ref,tc} = \sum_{k=1}^{K} x_{ref,ktc} \tag{8.3}$$

$$x_{in,tc} = \sum_{k=1}^{K} x_{in,ktc} \tag{8.4}$$

$$x_{out,f,tc} = \sum_{k=1}^{K} x_{out,f,ktc} \tag{8.5}$$

Second, each channel's ratio of the total loudness is calculated according to Equations (9.1, 9.2, 9.3 and 9.4):

$$x_{out,tc,r} = x_{out,tc} \Big/ \sum_{c=1}^{C} x_{out,tc} \tag{9.1}$$

$$x_{ref,tc,r} = x_{ref,tc} \Big/ \sum_{c=1}^{C} x_{ref,tc} \tag{9.2}$$

$$x_{in,tc,r} = x_{in,tc} \Big/ \sum_{c=1}^{C} x_{in,tc} \tag{9.3}$$

$$x_{out,f,tc,r} = x_{out,f,tc} \Big/ \sum_{c=1}^{C} x_{out,f,tc} \tag{9.4}$$

Third, the differences of each of the partial loudnesses with the previous block are calculated according to Equations (10.1, 10.2 and 10.3):

$$d_{out,tc} = x_{out,tc,r} - \hat{x}_{out,(t-1)c,r} \tag{10.1}$$

$$d_{ref,tc} = x_{ref,tc,r} - \hat{x}_{ref,(t-1)c,r} \tag{10.2}$$

$$d_{obj,it} = (x_{obj,it} - \hat{x}_{obj,i(t-1)}) / \max(x_{obj,it}, \hat{x}_{obj,i(t-1)}) \tag{10.3}$$

In other words, $d_{out,tc}$ corresponds to the difference between the partial loudness of the current block of the rendered audio 138 $x_{out,tc,r}$ and the partial loudness of the previous block of the rendered audio 138 $\hat{x}_{out,(t-1)c,r}$. Similarly, $d_{ref,tc}$ corresponds to the difference between the partial loudness of the current block of the reference audio 142 $x_{ref,tc,r}$ and the partial loudness of the previous block of the reference audio 142 $\hat{x}_{ref,(t-1)c,r}$. Note that the partial loudnesses of the previous block are denoted with the caret (^) to indicate they have been smoothed; see 220 below.

Fourth, the difference $d_t$ of the position of each block ($m_{i,t}$) with that of the previous block ($\hat{m}_{i,t-1}$) is computed according to Equation (11):

$$d_{m,i} = (m_{i,t} - \hat{m}_{i,t-1})^2 \quad (11)$$

In Equation (11), the positions $m_{i,t}$ may be calculated as in 206. Note that the positions of the previous block are denoted with the caret (^) to indicate they have been smoothed; see 220 below.

Fifth, the index of objects $f$ whose energy ratio exceeds a threshold θ is calculated according to the process of TABLE 1:

TABLE 1

| | |
|---|---|
| 1 | $ratio_i = x_{obj,it}/\Sigma_{i=1}^{t} x_{obj,it}$ |
| 2 | $f$ = i, if $ratio_i > \theta$ |

In other words, in line 1 the energy ratio is calculated. In line 2, if the energy ratio exceeds the threshold θ, the object i is added to the index $f$; if not, the object is not added to the index. In this manner, the quiet objects, e.g. those whose energy ratio does not exceed the threshold, are not indexed. The threshold may be adjusted as desired; a general range for the threshold value is between 0.0 and 0.5, and a typical value that works well is 0.2. For example, the user of the audio content generator 100 (see FIG. 1) can listen to the modified audio signal 150, perform an evaluation, adjust the threshold value, and may continue iterative evaluation until the threshold value produces acceptable results.

Sixth, the differences of the ratio of loudness between the rendered audio signal 138 ($x_{out,tc,r}$) and the reference audio signal 142 ($x_{ref,tc,r}$), and between the rendered audio signal 138 ($x_{out,f,tc,r}$) and the channel-based audio signal 130 ($x_{in,tc,r}$), are calculated according to Equations (12.1 and 12.2):

$$d_{tc,r} = x_{out,tc,r} - x_{ref,tc,r} \quad (12.1)$$

$$d_{tc,f,r} = x_{out,f,tc,r} - x_{in,tc,r} \quad (12.2)$$

In other words, the differences of loudness $d_{tc,r}$ and $d_{tc,f,r}$ are used to detect if there exists an energy change in the corresponding channels between the rendered audio signal 138 and the rendered audio signal 138, and between the rendered audio signal 138 and the channel-based audio signal 130.

Seventh, the weight score $w_{ij}$, the correlation score $cor_{ij}$ and the difference score $diff_{ij}$ are calculated. These calculations involve seven sub-steps. In sub-step 1, find the index i such that $d_{ti,r}<0.0$ and also i≤5 if C=9 or i≤7 if C=11. C is the total number of channels, as discussed at 202. This means that we only consider those channels have an energy decrease in the horizontal plane channels for renders of 5.1 to 5.1.4 and of 5.1 or 7.1 to 7.1.4.

In sub-step 2, find the index j such that $d_{tj,r}>0.0$. This is used to find out which channels have an energy increase.

Figure 3A:
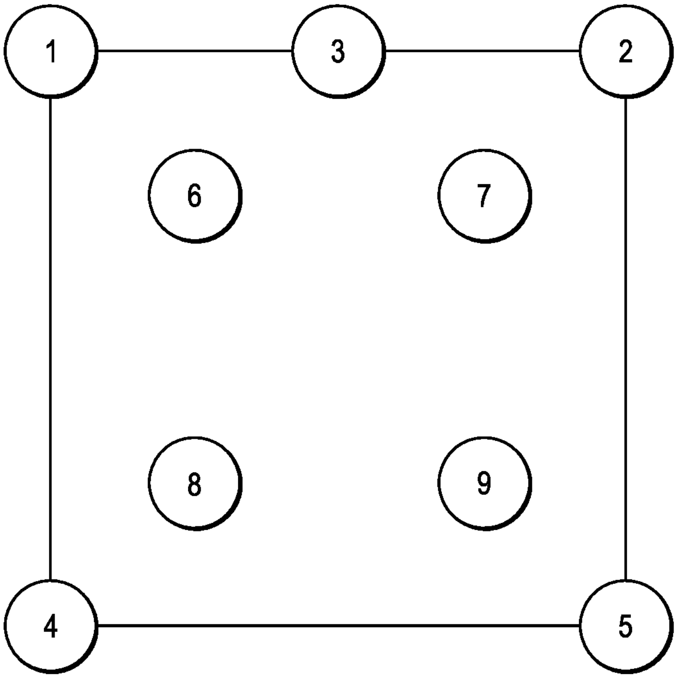
FIGS. 3A-3B are diagrams that show the mapping between channel numbers and regions.
Figure 3B:
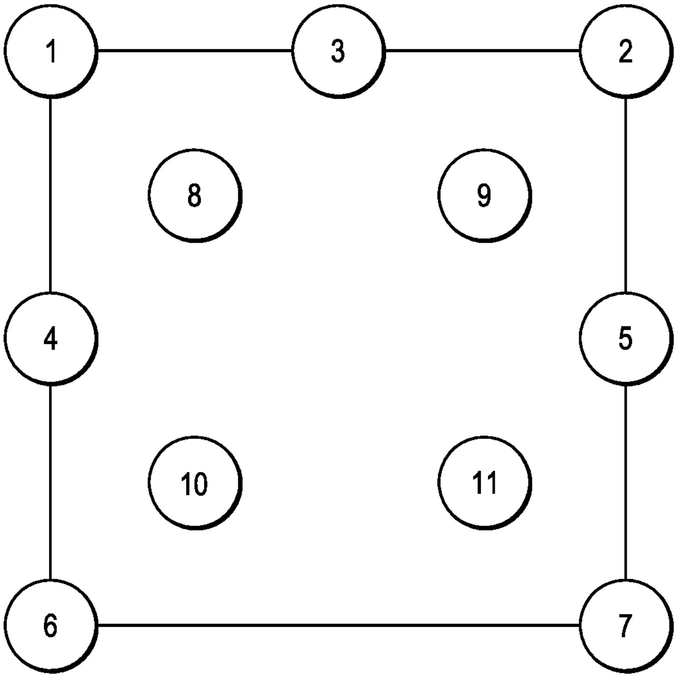

In sub-step 3, check whether the channel index i and j are in the same region of space. The mappings shown in FIGS. 3A-3B are used to make this determination. FIG. 3A shows the mapping between channel numbers and regions for 5.1.4, which has 9 channels, and FIG. 3B shows the mapping between channel numbers and regions for 7.1.4, which has 11 channels.

For C=9, using FIG. 3A, if i=1 and j=3,4,6,8, then i, j are in the same region. If i=2 and j=3,5,7,9, then i, j are in the same region. If i=3 and j=1,2,6,7, then i, j are in the same region. If i=4 and j=6,8, then i,j are in the same region. If i=5 and j=7,9, then i, j are in the same region.

For C=11, using FIG. 3B, if i=1 and j=3,4,6,8,10, then i,j are in the same region. If i=2 and j=3,5,7,9,11, then i,j are in the same region. If i=3 and j=1,2,8,9, then i, j are in the same region. If i=4,6 and j=6,8,10, then i, j are in the same region. If i=5,7 and j=7,9,11, then i, j are in the same region.

If the channel index i and j are in the same region of space, then calculate the weight score $w_{ij}$ and go to sub-step 4; otherwise go to sub-step 1 again.

The weight score $w_{ij}$ denotes the degree of energy change in the channel j between neighboring blocks. The weight score $w_{ij}$ may be calculated according to Equation (13):

$$w_{ij} = 1 + d_{out,tj} - d_{ref,tj} \quad (13)$$

In other words, the weight score corresponds to the difference between the difference of the loudnesses of the rendered audio 138 ($d_{out,tj}$, see Equation (10.1)) and the difference of the loudnesses of the reference audio 142 ($d_{ref,tj}$, see Equation (10.2)).

In sub-step 4, the weight score is updated to set $w_{ij}=0$ if any of the conditions in TABLE 2 are satisfied:

TABLE 2

| | |
|---|---|
| Condition 1 | $\theta_1 \le d_{out,tj} \le \theta_2$ & $\theta_3 \le d_{ref,tj} \le \theta_4$ |
| Condition 2 | $\theta_5 \le d_{out,tj} \le \theta_6$ & $\theta_7 \le d_{obj,ft} \le \theta_8$ & $r_t \ge \theta_9$ |
| Condition 3 | $\theta_{10} \le d_{obj,ft} \le \theta_{11}$ & $\theta_{12} \le d_{m,f} \le \theta_{13}$ |
| Condition 4 | $\theta_{14} \le d_{m,f} \le \theta_{15}$ |
| Condition 5 | $r_t \ge \theta_{16}$ |
| Condition 6 | $sum(d_{tc,f,r}) < \theta_{17}$ |

These parameters $\theta_1$ to $\theta_{17}$ are thresholds. In general, the thresholds are set to values such that a given weight score is set to zero when any of the conditions in TABLE 2 are satisfied. In such a case, the probability of the appearance of artifacts in the extracted objects is small, so the weight score is set to zero in order to make the final score small as well. For example, for Condition 4, if $d_{m,f}$ is small, then the objects are continuous, and no artifacts exist. For Condition 5, if $r_t$ is large, most of the content in the input is extracted to objects, and no artifacts exist. An example of default values is as follows: $\theta_1$=−0.1, $\theta_2$=0.1, $\theta_3$=−0.1, $\theta_4$=0.1, $\theta_5$=−0.15, $\theta_6$=0.15, $\theta_7$=−0.25, $\theta_8$=0.25, $\theta_9$=0.5, $\theta_{10}$=−0.35, $\theta_{11}$=0.35, $\theta_{12}$=−0.02, $\theta_{13}$=0.02, $\theta_{14}$=−0.01, $\theta_{15}$=0.01, $\theta_{16}$=0.7, $\theta_{17}$=0.1.

In sub-step 5, calculate the correlation $corr_{ij}$ between the partial loudness of the channel i in the t−1 block $x_{out,k(t-1)i}$ with the partial loudness of the channel j in the t block $x_{out,ktj}$. This is used to check whether the content energy in channel i and the content energy in channel j are correlated or not, for the rendered audio 138.

In sub-step 6, calculate the difference score $diff_{ij}$ between the loudness ratio of channel i and channel j, according to the following two steps. First, calculate the position weight parameter $p_{ij}$ between channel i and channel j. The position weight parameter $p_{ij}$ may be calculated according to the process of TABLE 3:

TABLE 3

| | |
|---|---|
| 1 | Set $p_{ij}$ = 1 |
| 2 | If C = 11 |

TABLE 3-continued

| | |
|---|---|
| 3 | If i = 1,2,3, then $p_{ij} = p_{ij} + 0.25$ |
| 4 | If j = 1,2,3,8,9, then $p_{ij} = p_{ij} + 0.5$ |
| 5 | If C = 9 |
| 6 | If i = 1,2,3, then $p_{ij} = p_{ij} + 0.25$ |
| 7 | If j = 1,2,3,6,7, then $p_{ij} = p_{ij} + 0.5$ |

In other words, the process of TABLE 3 is used to increase the position weight when the channel i and j are in the front (see FIGS. 3A-3B), because the front channels are more important for listening.

Second, calculate the difference score $diff_{ij}$ according to Equation (14):

$$diff_{ij} = f_1(p_{ij}, d_{tj,r}, d_{ti,r}) \tag{14}$$

In Equation (14), the function $f_1$ is a combination of $p_{ij}$, $d_{tj,r}$ and $d_{ti,r}$. One example of $f_1$ is given by Equation (15):

$$f_1(p_{ij}, d_{tj,r}, d_{ti,r}) = p_{ij} * (d_{tj,r} - d_{ti,r}) \tag{15}$$

In other words, the difference score corresponds to the difference between the differences of the ratios of loudness for the channels (see Equation (12.1)), scaled by the position weight parameter $p_{ij}$. The difference score denotes the degree of energy boost in channel j.

In sub-step 7, the boost score $score_{ij}$ of the current i,j pair is calculated using Equation (16):

$$\text{score}_{ij} = f_2(corr_{ij}, w_{ij}, diff_{ij}) \tag{16}$$

In Equation (16), the function $f_2$ is a combination of $corr_{ij}$, $w_{ij}$ and $diff_{ij}$. One example of $f_2$ is given by Equation (17):

$$f_2(corr_{ij}, w_{ij}, diff_{ij}) = corr_{ij} * w_{ij} * diff_{ij} \tag{17}$$

In other words, the boost score is the product of the correlation of the partial loudness between the channels ($corr_{ij}$, see sub-step 5 above), the degree of energy change in the channels between neighboring blocks (the weight score $w_{ij}$, see Equation (13)), and the difference score between the loudness ratios of the channels ($diff_{ij}$, see sub-step 6 above). Accordingly, the final boost score will be high if the degree of energy boost in channel j is high and if the content in channel i and j are highly correlated and also if the content in channel j changes fast between neighboring blocks. In general, the boost score increases as one or more of its components increase.

Eighth, calculate the final boost score $boost_{score}$ using the boost scores $score_{ij}$ with the two highest difference scores $diff_{ij}$. For example, when the largest difference score is a component of the boost score $score_A$, and the next-largest difference score is a component of the boost score $score_B$, the final boost score $boost_{score}$ may be calculated according to Equation (18):

$$\text{boost}_{score} = \text{score}_A + \text{score}_B \tag{18}$$

At 210, compute the deviation metrics between the partial loudness of the rendered audio 138 ($d_{out,tc}$) and the reference audio 142 ($d_{ref,tc}$). The deviation metrics include $std_{out,t}$, $std_{ref,t}$, $std_{dif,t}$ and $std_{r,t}$. The standard deviation of $d_{out,tc}$ is calculated for all channels to obtain $std_{out,t}$. The standard deviation of $d_{ref,tc}$ is calculated for all channels to obtain $std_{ref,t}$. The deviation difference $std_{dif,t}$ of $std_{out,t}$ and $std_{ref,t}$ may be calculated according to Equation (19):

$$std_{dif,t} = std_{out,t} - std_{ref,t} \tag{19}$$

In other words, the deviation difference is the difference between the standard deviation of the partial loudness of the rendered audio 138 and the standard deviation of the partial loudness of the reference audio 142.

The deviation ratio $std_{r,t}$ of $std_{out,t}$ and $std_{ref,t}$ may be calculated according to Equation (20):

$$std_{r,t} = \min(\text{ratio\_threshold}, std_{out,t}/std_{ref,t}) \tag{20}$$

In other words, the deviation ratio is the minimum of a threshold parameter and the ratio of the standard deviation of the partial loudness of the rendered audio 138 and the standard deviation of the partial loudness of the reference audio 142. The threshold parameter ratio_threshold operates as a ceiling for the deviation ratio. A typical value for the threshold parameter is 8; this value may be increased in order to make $std_{r,t}$ more sensitive to the ratio $std_{out,t}/std_{ref,t}$ when the ratio $std_{out,t}/std_{ref,t}$ is large enough, or decreased in order to make $std_{r,t}$ robust to the outliers of the ratio $std_{out,t}/std_{ref,t}$. For example, when the ratio $std_{out,t}/std_{ref,t}$ is large, however no artifacts exist, then the threshold parameter ratio_threshold should be decreased.

At 212, compute the continuity score $con_{score}$ of the block t according to Equation (21):

$$con_{score} = f_3(std_{dif,t}, std_{r,t}, \text{boost}_{score}) \tag{21}$$

In Equation (21), the function $f_3$ is a combination of $std_{dif,t}$, $std_{r,t}$ and $boost_{score}$. One example of $f_3$ is given by Equation (22):

$$f_3(std_{dif,t}, std_{r,t}, \text{boost}_{score}) = \tanh(std_{dif,t} * std_{r,t} * \text{boost}_{score}) \tag{22}$$

In other words, the continuity score ranges between 0 and 1, due to the hyperbolic tangent function being applied to a positive number, and increases when increasing one or more of the components of the combination, e.g. the deviation difference, the deviation ratio and the final boost score.

At 214, compute the weight of objects energy $obj_{score}$ according to Equation (23):

$$obj_{score} = f_4(r_t) \tag{23}$$

In Equation (23), the function $f_4$ is based on the energy ratio $r_t$ (see Equation (1)). One example of $f_4$ is given by Equation (24):

$$f_4 = 1 + \tanh\left(\max\left(r_t - 0.5, 0\right)^2\right) \tag{24}$$

In other words, the weight of objects energy $obj_{score}$ ranges between 1 and about 1.25, due to the hyperbolic tangent function applied to a squared value with a minimum value of zero, and increases as the energy ratio $r_t$ increases above 0.5. In summary, a higher weight of objects energy results from the objects with a larger energy.

At 216, compute a loudness weight $loud_{score}$ of the rendered audio signal 138. First, the total loudness $x_{out,t}$ of the rendered audio signal 138 is calculated according to Equation (25):

$$x_{out,t} = \sum_{c=1}^{C} x_{out,tc} \tag{25}$$

In other words, the total loudness $x_{out,t}$ is the sum over all channels C of the partial loudness of the rendered audio signal 138 ($x_{out,tc}$, see also Equation (8.2)).

Second, the loudness weight $loud_{score}$ is calculated according to Equation (26):

$$\text{loud}_{score} = f_5(x_{out,t}) \tag{26}$$

In Equation (26), the function $f_5$ is based on the total loudness $x_{out,t}$. One example of $f_5$ is given by Equation (27):

$$f_5(x_{out,t}) = \tanh\left(x_{out,t}/100\right) \tag{27}$$

In other words, the loudness weight $loud_{score}$ ranges between 0 and 1, due to the hyperbolic tangent applied to a positive number, and increases as the total loudness $x_{out,t}$ increases. Consequently, a higher loudness weight score results for larger values of the loudness of the rendered audio signal 138.

At 218, compute a detection score $score_t$ for the block according to Equation (28):

$$\text{score}_t = f_6(con_{score}, obj_{score}, \text{loud}_{score}) \tag{28}$$

In other words, the detection score $score_t$ is a combination of the continuity score $con_{score}$ (see also Equation (21)), the weight of objects energy $obj_{score}$ (see also Equation (23)), and the loudness weight $loud_{score}$ (see also Equation (26)). One example of $f_6$ is given by Equation (29):

$$f_6(con_{score}, obj_{score}, \text{loud}_{score}) = con_{score} * obj_{score} * \text{loud}_{score} \tag{29}$$

In other words, the detection score $score_t$ is the product of the continuity score $con_{score}$, the weight of objects energy $obj_{score}$, and the loudness weight $loud_{score}$. In general, the detection score increases as one or more of its components increase.

At 220, the ratio of total loudness of the rendered audio signal 138 ($x_{out,tc,r}$), the ratio of total loudness of the reference audio signal 142 ($x_{ref,tc,r}$), the energy of each of the audio objects 134 ($x_{obj,it}$), and the position of each of the audio objects 134 ($m_{i,t}$) are each smoothed. The smoothed ratio of total loudness of the rendered audio signal 138 is denoted as $\hat{x}_{out,tc,r}$ and may be calculated according to Equation (30.1):

$$\hat{x}_{out,tc,r} = \mu * \hat{x}_{out,(t-1)c,r} + (1-\mu) * x_{out,tc,r} \tag{30.1}$$

In Equation (30.1), the ratio of total loudness of the rendered audio signal 138 ($x_{out,tc,r}$) may be calculated according to Equation (9.1).

The smoothed ratio of total loudness of the reference audio signal 142 is denoted as ref,tc,r and may be calculated according to Equation (30.2):

$$\hat{x}_{ref,tc,r} = \mu * \hat{x}_{ref,(t-1)c,r} + (1-\mu) * x_{ref,tc,r} \tag{30.2}$$

In Equation (30.2), the ratio of total loudness of the reference audio signal 142 ($x_{ref,tc,r}$) may be calculated according to Equation (9.2).

The smoothed energy of each of the audio objects 134 is denoted as $\hat{x}_{obj,it}$ and may be calculated according to Equation (30.3):

$$\hat{x}_{obj,it} = \mu * \hat{x}_{obj,i(t-1)} + (1-\mu) * x_{obj,it} \tag{30.3}$$

In Equation (30.3), the energy of each of the audio objects 134 ($x_{obj,it}$) may be calculated according to Equation (8.1).

The smoothed position of each of the audio objects 134 is denoted as $\hat{m}_{i,t}$ and may be calculated according to Equation (30.4):

$$\hat{m}_{i,t} = \mu * \hat{m}_{i,t-1} + (1-\mu) * m_{i,t} \tag{30.4}$$

In Equation (30.4), the position of each of the audio objects 134 ($m_{i,t}$) may be calculated according to Equation (6).

In Equations (30.1, 30.2, 30.3 and 30.4), the value of each signal in the current block (t) is smoothed with the value in the previous block (t−1) according to the smoothing parameter (μ). The default value for the smoothing parameter is 0.5. The smoothing parameter may be adjusted as desired by the user of the audio content generator 100 (see FIG. 1), e.g. according to an evaluation of listening to the modified audio signal 150. If the results of the evaluation are that the modified audio signal 150 is undesirable, e.g. it contains discontinuities, the smoothing parameter may be increased. If the results of the evaluation are that the modified audio signal 150 is desirable, e.g. it does not contain discontinuities, the smoothing parameter may be decreased, in order to increase the responsiveness of the modified audio signal 150 to the current results of the bed generation and object extraction.

The smoothed values computed as per Equations (30.1, 30.2, 30.3 and 30.4) are used when computing Equations (10.1, 10.2, 10.3 and 11) for the next block; see 208 above.

Returning to FIG. 1, the adaptive post-processor 116 receives the detection score 144, performs averaging and smoothing, and generates parameters 146 based on the detection score 144. The adaptive post-processor 116 may operate on a per-block basis. To perform averaging, the adaptive post-processor 116 may compute an average detection score $\widetilde{score}_t$ for a given block t by averaging the detection scores of the K previous blocks and the K subsequent blocks according to the process detailed in TABLE 4.

TABLE 4

| | |
|---|---|
| 1 | $\widetilde{score}_t = 0$ |
| 2 | For i = t − K:t + K |
| 3 | dis = abs(t − i) |
| 4 | w = exp(−dis) |
| 5 | $\widetilde{score}_t = \widetilde{score}_t + score_i * w$ |

In other words, at line 1, the average detection score is initialized to zero. At line 2, the block count i is looped from t−K to t+K. At lines 3-4, a weight w is calculated, where the weight is reduced the further away the previous block, or the subsequent block, is from the given block t. At line 4, the exponential function may be replaced by another function as desired; in general, the weight w decreases as dis increases. At line 5, the weight is applied to the detection score of each of the blocks, and the weighted detection scores are summed to generate the average detection score.

In the process of TABLE 4, the parameter K is an adjustable value that may be between 1 and 15. Increasing K corresponds to increasing the threshold of discontinuity detection, and decreasing K corresponds to decreasing the threshold of discontinuity detection. Values of K that work well are 5 and 10. The adaptive post-processor 116 may start with a value of 5, and the user can evaluate the results of generating the modified audio 150; if the results are unacceptable, the user can adjust K to 10 and evaluate the results.

In summary, the adaptive post-processor 116 performs averaging to look at more than one than one block in order to identify discontinuities based on the detection score 144.

To perform smoothing, the adaptive post-processor 116 may adjust the average detection score according to the process detailed in TABLE 5:

TABLE 5

| | |
|---|---|
| 1 | If $\widetilde{score}_t \geq \widetilde{score}_{t-1}$: |
| 2 | $\widetilde{score}_t = \alpha_f * \widetilde{score}_t + (1 - \alpha_f) * \widetilde{score}_{t-1}$ |
| 3 | else: |
| 4 | $\widetilde{score}_t = \alpha_t * \widetilde{score}_t + (1 - \alpha_t) * \widetilde{score}_{t-1}$ |

The parameters $a_f$ and $a_t$ are smoothing parameters; their sum is 1.0. The value for $a_f$ may range between 0.60 and 0.80; a value of 0.70 works well. The value for $a_t$ may range between 0.20 and 0.40; a value of 0.30 works well. The user can evaluate the results of generating the modified audio 150; if the results are unacceptable, the user can adjust the smoothing parameters and evaluate the results.

In other words, at lines 1-2, if the average detection score of the current block is greater than or equal to the average detection score of the previous block, the average detection score of the current block is adjusted, e.g. reduced, a bit toward that of the previous block. At lines 3-4, if the average detection score of the current block is less than the average detection score of the previous block, the average detection score of the current block is adjusted, e.g. increased, a bit toward that of the previous block.

In summary, the adaptive post-processor 116 performs smoothing to reduce the changes in the detection score between successive blocks, to reduce the threshold of the alarm rate, at the expense of increasing the false alarm rate, in order to make the system more sensitive to discontinuity detection.

The signal modifier 118 receives the channel-based audio signal 130, the bed channels 132, the audio objects 134 and the parameters 146, performs signal modification, and generates the modified audio signal 150 based on the channel-based audio signal 130, the bed channels 132, the audio objects 134 and the parameters 146. The modified audio signal 150 includes modified audio objects and modified bed channels. The modified audio objects correspond to the audio objects 134 modified according to the parameters 146. The modified bed channels correspond to the bed channels 132 modified according to the parameters 146. The modified audio signal 150 may also include the metadata 136. The signal modifier 118 may modify the inputs as follows.

First, the signal modifier 118 computes a mixing parameter $wetdry_t$ according to Equation (31):

$$wetdry_t = 1 - \widetilde{score}_t \tag{31}$$

The average detection score $\widetilde{score}_t$ is as computed by the adaptive post-processor 116 discussed above. In other words, the mixing parameter $wetdry_t$ operates as a crossfade or mixing between the original input, e.g. the channel-based audio signal 130, and the extracted signals, e.g. the audio objects 134 and the bed channels 132. The mixing parameter ranges from 0, e.g. bypass, to 1, e.g. apply the full effect of the extracted audio objects 134 and bed channels 132.

The signal modifier 118 modifies the extracted audio objects 134 according to Equation (32):

$$x_{obj,i,t} = wetdry_t * x_{obj,i,t} \tag{32}$$

The signal modifier 118 modifies the bed channels 132 differently depending upon which channel is being modified. For the left, right and center channels (j=L, R, C), the signal modifier 118 performs modification of the bed channels 132 according to Equation (33.1):

$$x_{bed,j,t} = x_{in,tj} * (1 - wetdry_t) + x_{bed,j,t} * wetdry_t \tag{33.1}$$

For the left side surround and left rear surround channels (j=Lss, Lrs), the signal modifier 118 performs modification of the bed channels 132 according to Equation (33.2):

$$x_{bed,j,t} = x_{in,t,Ls} * (1 - wetdry_t) * 0.707 + x_{bed,j,t} * wetdry_t \tag{33.2}$$

For the right side surround and right rear surround channels (j=Rss, Rrs), the signal modifier 118 performs modification of the bed channels 132 according to Equation (33.3):

$$x_{bed,j,t} = x_{in,t,Rs} * (1 - wetdry_t) * 0.707 + x_{bed,j,t} * wetdry_t \tag{33.3}$$

In other words, the signal modifier 118 crossfades the extracted signal, e.g. the bed channels 132 or the audio objects 134, and the original signal, e.g. the channel-based audio signal 130, using the mixing parameter to generate the modified audio signal 150.

Figure 4:
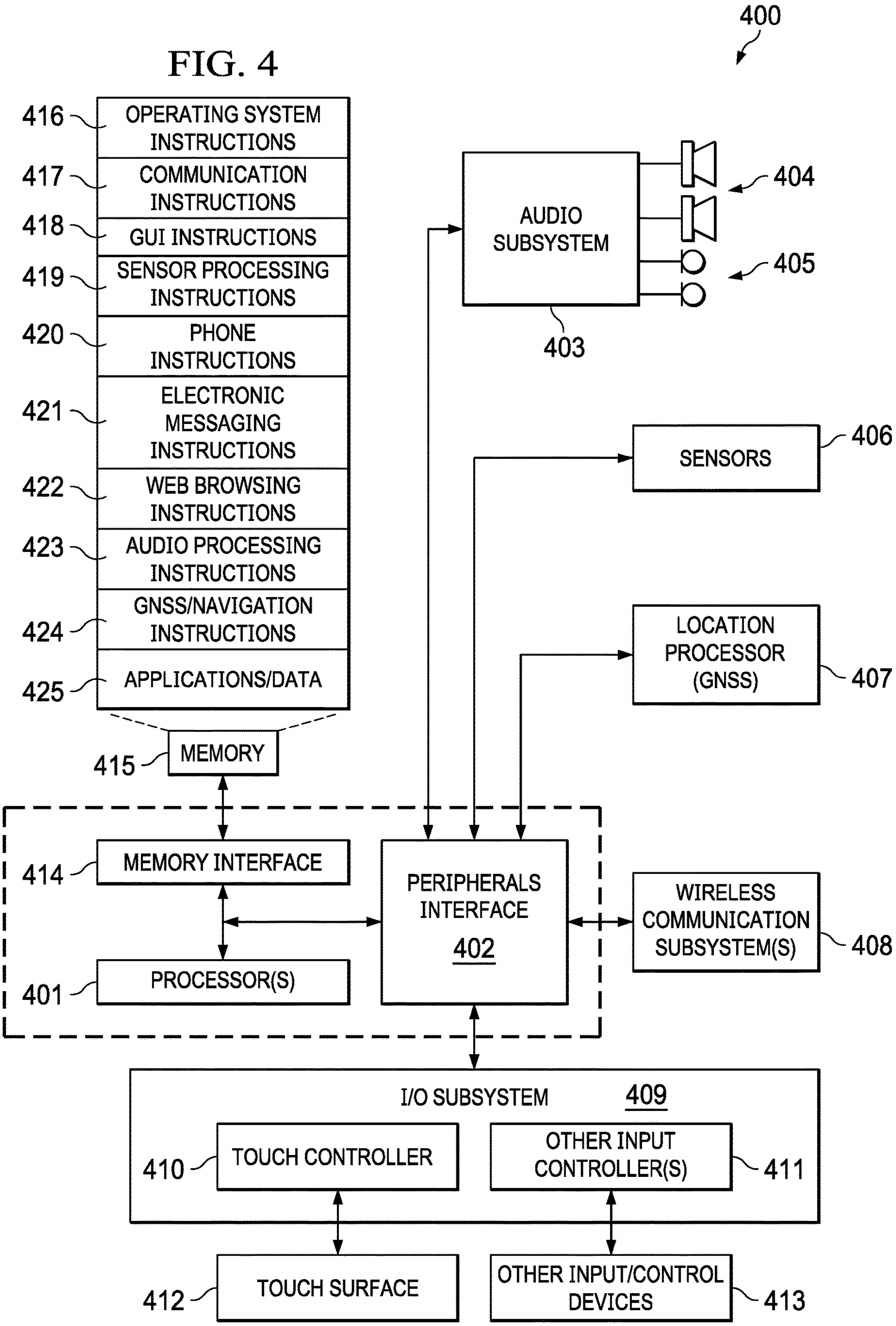
FIG. 4 is a device architecture 400 for implementing the features and processes described herein, according to an embodiment.

FIG. 4 is a device architecture 400 for implementing the features and processes described herein, according to an embodiment. The architecture 400 may be implemented in any electronic device, including but not limited to: a desktop computer, consumer audio/visual (AV) equipment, radio broadcast equipment, mobile devices, e.g. smartphone, tablet computer, laptop computer, wearable device, etc. In the example embodiment shown, the architecture 400 is for a laptop computer and includes processor(s) 401, peripherals interface 402, audio subsystem 403, loudspeakers 404, microphone 405, sensors 406, e.g. accelerometers, gyros, barometer, magnetometer, camera, etc., location processor 407, e.g. GNSS receiver, etc., wireless communications subsystems 408, e.g. Wi-Fi, Bluetooth, cellular, etc., and I/O subsystem(s) 409, which includes touch controller 410 and other input controllers 411, touch surface 412 and other input/control devices 413. Other architectures with more or fewer components can also be used to implement the disclosed embodiments.

Memory interface 414 is coupled to processors 401, peripherals interface 402 and memory 415, e.g., flash, RAM, ROM, etc. Memory 415 stores computer program instructions and data, including but not limited to: operating system instructions 416, communication instructions 417, GUI instructions 418, sensor processing instructions 419, phone instructions 420, electronic messaging instructions 421, web browsing instructions 422, audio processing instructions 423, GNSS/navigation instructions 424 and applications/data 425. Audio processing instructions 423 include instructions for performing the audio processing described herein.

According to an embodiment, the architecture 400 may correspond to a PC or laptop computer than an audio engineer uses to generate the modified audio signal 150 from the channel-based audio signal 130 (see FIG. 1).

Figure 5:
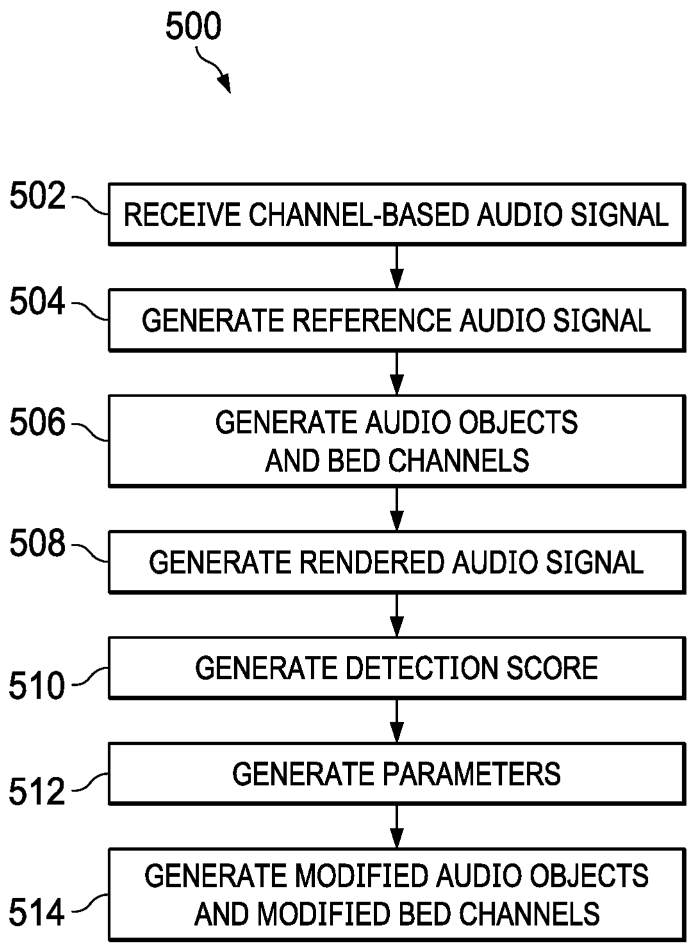
FIG. 5 is a flowchart of a method 500 of audio processing.

FIG. 5 is a flowchart of a method 500 of audio processing. The method 500 may be performed by a device, e.g. a laptop computer, a mobile telephone, etc., with the components of the architecture 400 of FIG. 4, to implement the functionality of the audio content generator 100 (see FIG. 1), etc., for example by executing one or more computer programs.

At 502, a channel-based audio signal is received. For example, the audio content generator 100 (see FIG. 1) may receive the channel-based audio signal 130, e.g. from storage in the memory 415 (see FIG. 4).

At 504, a reference audio signal is generated based on the channel-based audio signal. For example, the renderer 112 (see FIG. 1) may generate the reference audio signal 142 based on the channel-based audio signal 130.

At 506, audio objects and bed channels are generated based on the channel-based audio signal. For example, the bed generator 102 (see FIG. 1) may generate the bed channels 132, and the object generator 104 may generate the audio objects 134, based on the channel-based audio signal 130.

At 508, a rendered audio signal is generated based on the audio objects and the bed channels. For example, the renderer 108 (see FIG. 1) may generate the rendered audio signal 138 based on the audio objects 134 and the bed channels 132. The renderer 108 may also use the metadata 136 when generating the rendered audio signal 138.

At 510, a detection score is generated based on the partial loudnesses of a number of signals, where the number of signals includes the reference audio signal, the audio objects, the bed channels, the rendered audio signal and the channel-based audio signal. The detection score is indicative of an audio artifact in one or more of the plurality of audio objects and the plurality of bed channels. For example, the controller 114 (see FIG. 1) may generate the detection score 144 based on the partial loudnesses of the reference audio signal 142, the audio objects 134, the bed channels 132, the rendered audio signal 138 and the channel-based audio signal 130. The controller 114 may implement one or more sub-steps when generating the detection score 144, including one or more of the steps shown in the method 200 of FIG. 2.

At 512, parameters are generated based on the detection score. For example, the adaptive post-processor 116 (see FIG. 1) may generate the parameters 146 based on the detection score 144. The adaptive post-processor 116 may operate on a per-block basis, and may include an adjustable threshold that looks at the blocks before and after the current block when generating the parameters.

At 514, modified audio objects and modified bed channels are generated based on the channel-based audio signal, the audio objects, the bed channels and the parameters. For example, the signal modifier 118 (see FIG. 1) may generate the modified audio signal 150, e.g. that includes the modified audio objects and the modified bed channels, based on the channel-based audio signal 130, the audio objects 134, the bed channels 132 and the parameters 146. The signal modifier 118 may include a mixing parameter that operates as a crossfade between the original input, e.g. the channel-based audio signal 130, and the extracted signals, e.g. the audio objects 134 and the bed channels 132.

The modified audio signal 150 may then be stored in the memory of the device, e.g. in a solid-state memory, transmitted to another device, e.g. for cloud storage, rendered into an audio presentation and outputted as sound, e.g. using one or more loudspeakers, etc.

The method 500 may include additional steps corresponding to the other functionalities of the audio content generator 100, etc. as described herein.

Implementation Details

An embodiment may be implemented in hardware, executable modules stored on a computer readable medium, or a combination of both, e.g. programmable logic arrays, etc. Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus, e.g. integrated circuits, etc., to perform the required method steps. Thus, embodiments may be implemented in one or more computer programs executing on one or more programmable computer systems each comprising at least one processor, at least one data storage system, including volatile and non-volatile memory and/or storage elements, at least one input device or port, and at least one output device or port. Program code is applied to input data to perform the functions described herein and generate output information. The output information is applied to one or more output devices, in known fashion.

Each such computer program is preferably stored on or downloaded to a storage media or device, e.g., solid state memory or media, magnetic or optical media, etc., readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. Software per se and intangible or transitory signals are excluded to the extent that they are unpatentable subject matter.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical, non-transitory, non-volatile storage media in various forms, such as optical, magnetic or semiconductor storage media.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

Various aspects of the present invention may be appreciated from the following enumerated example embodiments (EEEs):

EEE1. A computer-implemented method of audio processing, the method comprising:

receiving a channel-based audio signal;

generating a reference audio signal based on the channel-based audio signal;

generating a plurality of audio objects and a plurality of bed channels based on the channel-based audio signal;

generating a rendered audio signal based on the plurality of audio objects and the plurality of bed channels;

generating a detection score based on a plurality of partial loudnesses of a plurality of signals, wherein the plurality of signals includes the reference audio signal, the plurality of audio objects, the plurality of bed channels, the rendered audio signal and the channel-based audio signal, wherein the detection score is indicative of an audio artifact in one or more of the plurality of audio objects and the plurality of bed channels;

generating a plurality of parameters based on the detection score; and generating a plurality of modified audio objects and a plurality of modified bed channels based on the channel-based audio signal, the plurality of audio objects, the plurality of bed channels and the plurality of parameters.

EEE2. The computer-implemented method of EEE 1, further comprising:

outputting, by one or more loudspeakers, a rendering of the plurality of modified audio objects and the plurality of modified bed channels as sound.

EEE3. The computer-implemented method of any one of EEEs 1-2, wherein the channel-based audio signal comprises a plurality of blocks, wherein a given block of the plurality of blocks comprises a plurality of samples, and wherein the detection score is generated on a per-block basis for the plurality of blocks.

EEE4. The computer-implemented method of any one of EEEs 1-3, wherein generating the detection score includes:

computing the plurality of partial loudnesses, wherein the plurality of partial loudnesses includes a partial loudness of the reference audio signal, a partial loudness of the plurality of audio objects, a partial loudness of the plurality of bed channels, a partial loudness of the rendered audio signal, and a partial loudness of the channel-based audio signal.

EEE5. The computer-implemented method of any one of EEEs 1-4, wherein generating the detection score includes:

computing a ratio between a first energy and a second energy, wherein the first energy is an energy of the plurality of audio objects, and wherein the second energy is a sum of the energy of the plurality of audio objects and an energy of the plurality of bed channels, wherein the detection score is generated based on the ratio between the first energy and the second energy.

EEE6. The computer-implemented method of any one of EEEs 1-5, wherein generating the detection score includes:

computing an average position for each of the plurality of audio objects, wherein the detection score is generated based on the average position for each of the plurality of audio objects.

EEE7. The computer-implemented method of any one of EEEs 1-6, wherein generating the detection score includes:

computing a plurality of boost scores based on the plurality of partial loudnesses, wherein the plurality of partial loudnesses includes a partial loudness of the channel-based audio signal, a partial loudness of the reference audio signal, a partial loudness of the plurality of audio objects, and a partial loudness of the rendered audio signal; and computing a final boost score based on a sum of a largest one of the plurality of boost scores and a next-largest one of the plurality of boost scores, wherein the detection score is generated based on the final boost score.

EEE8. The computer-implemented method of EEE 7, wherein a given boost score of the plurality of boost scores comprises a product of a first value, a second value and a third value, wherein the first value is a correlation of the partial loudness between a plurality of channels of a given signal, wherein the second value is a degree of energy change in the plurality of channels of the given signal between neighboring blocks, and wherein the third value is a difference score between a plurality of loudness ratios of the plurality of channels of the given signal.

EEE9. The computer-implemented method of any one of EEEs 1-8, wherein generating the detection score includes:

computing a plurality of deviation metrics between a partial loudness of the rendered audio signal and a partial loudness of the reference audio signal, wherein the plurality of deviation metrics includes a deviation difference and a deviation ratio, wherein the deviation difference is a difference between a standard deviation of the partial loudness of the rendered audio signal and a standard deviation of the partial loudness of the reference audio signal, wherein the deviation ratio is based on a ratio between the standard deviation of the partial loudness of the rendered audio signal and the standard deviation of the partial loudness of the reference audio signal, and wherein the detection score is generated based on the plurality of deviation metrics.

EEE10. The computer-implemented method of EEE 9, wherein the detection score is generated based on a hyperbolic tangent function applied to a product of the deviation difference and the deviation ratio.

EEE11. The computer-implemented method of any one of EEEs 1-10, wherein generating the detection score includes:

computing a continuity score based on a deviation difference, a deviation ratio and a boost score, wherein the deviation difference is a difference between a standard deviation of a partial loudness of the rendered audio signal and a standard deviation of a partial loudness of the reference audio signal, wherein the deviation ratio is based on a ratio between the standard deviation of the partial loudness of the rendered audio signal and the standard deviation of the partial loudness of the reference audio signal, wherein the boost score is based on a partial loudness of the channel-based audio signal, the partial loudness of the reference audio signal, a partial loudness of the plurality of audio objects, and the partial loudness of the rendered audio signal, and wherein the detection score is generated based on the continuity score.

EEE12. The computer-implemented method of EEE 11, wherein the detection score is generated based on a hyperbolic tangent function applied to a sum of a first value and a second value, wherein the first value is a product of the deviation difference and the deviation ratio, and wherein the second value is the continuity score.

EEE13. The computer-implemented method of any one of EEEs 1-12, wherein generating the detection score includes:

computing a weight of objects energy based on a ratio between a first energy and a second energy, wherein the first energy is an energy of the plurality of audio objects, and wherein the second energy is a sum of the energy of the plurality of audio objects and an energy of the plurality of bed channels, wherein the detection score is generated based on the weight of objects energy.

EEE14. The computer-implemented method of EEE 13, wherein the detection score is generated based on a hyperbolic tangent function applied to the weight of objects energy.

EEE15. The computer-implemented method of any one of EEEs 1-14, wherein generating the detection score includes:

computing a loudness weight of a partial loudness of the rendered audio signal, wherein the loudness weight increases as the partial loudness of the rendered audio signal increases, and wherein the detection score is generated based on the loudness weight.

EEE16. The computer-implemented method of any one of EEEs 1-15, wherein generating the detection score includes:

computing a continuity score based on a deviation difference, a deviation ratio and a boost score;

computing a weight of objects energy based on a ratio between a first energy and a second energy, wherein the first energy is an energy of the plurality of audio objects, and wherein the second energy is a sum of the energy of the plurality of audio objects and an energy of the plurality of bed channels; and computing a loudness weight of a partial loudness of the rendered audio signal, wherein the loudness weight increases as the partial loudness of the rendered audio signal increases, wherein the deviation difference is a difference between a standard deviation of a partial loudness of the rendered audio signal and a standard deviation of a partial loudness of the reference audio signal, wherein the deviation ratio is based on a ratio between the standard deviation of the partial loudness of the rendered audio signal and the standard deviation of the partial loudness of the reference audio signal, wherein the boost score is based on a partial loudness of the channel-based audio signal, the partial loudness of the reference audio signal, a partial loudness of the plurality of audio objects, and the partial loudness of the rendered audio signal, and wherein the detection score is generated based on the continuity score, the weight of objects energy and the loudness weight.

EEE17. The computer-implemented method of any one of EEEs 1-16, wherein generating the detection score includes:

smoothing a ratio of total loudness of the rendered audio signal, a ratio of total loudness of the reference audio signal, an energy of each of the plurality of audio objects, and a position of each of the plurality of audio objects, wherein the detection score is generated based on the ratio of total loudness of the rendered audio signal having been smoothed, the ratio of total loudness of the reference audio signal having been smoothed, the energy of each of the plurality of audio objects having been smoothed, and the position of each of the plurality of audio objects having been smoothed.

EEE18. A non-transitory computer readable medium storing a computer program that, when executed by a processor, controls an apparatus to execute processing including the method of any one of EEEs 1-17.

EEE19. An apparatus for audio processing, the apparatus comprising:

a processor, wherein the processor is configured to control the apparatus to execute processing including the method of any one of EEEs 1-17.

EEE20. The apparatus of EEE 19, further comprising:

one or more loudspeakers that are configured to output a rendering of the plurality of modified audio objects and the plurality of modified bed channels as sound.

REFERENCES

U.S. Pat. Nos. 9,756,445; 9,794,718; 9,165,558; 10,275,685; 6,167,404.

U.S. Patent Application Pub. Nos. 2020/0322743; 2017/0098452; 2020/0126570.

Philip Coleman, Andreas Franck, Jon Francombe, Qingju Liu, Teofilo de Campos, Richard J. Hughes, Dylan Menzies, Marcos F. Simon Galvez, Yan Tang, James Woodcock, Philip J. B. Jackson, Frank Melchior, Chris Pike, Filippo M. Fazi, Trevor J. Cox and Adrian Hilton, An Audio-Visual System for Object-Based Audio: From Recording to Listening, in IEEE Transactions on Multimedia (Volume: 20, Issue: 8, August 2018), DOI: 10.1109/TMM.2018.2794780.

Benjamin Guy Shirley, Improving Television Sound for People with Hearing Impairments, PhD Thesis, University of Salford (2013), DOI: 10.13140/2.1.3823.4881.

Joao Martins, Object-Based Audio and Sound Reproduction (Apr. 26, 2018), available at <audioxpress.com/article/object-based-audio-and-sound-reproduction>.

The invention claimed is:

1. A computer-implemented method of audio processing, the method comprising:

receiving a channel-based audio signal;

generating one or more reference bed channels based on the channel-based audio signal;

generating a reference audio signal based on the one or more reference bed channels;

generating a plurality of audio objects and a plurality of bed channels based on the channel-based audio signal;

generating a rendered audio signal based on the plurality of audio objects and the plurality of bed channels;

generating a detection score based on a plurality of partial loudnesses of a plurality of signals, wherein the plurality of signals includes the reference audio signal, the plurality of audio objects, the plurality of bed channels, the rendered audio signal and the channel-based audio signal, wherein the detection score is indicative of an audio artifact in one or more of the plurality of audio objects and the plurality of bed channels;

generating a plurality of mixing parameters based on the detection score; and generating a plurality of modified audio objects and a plurality of modified bed channels based on the channel-based audio signal, the plurality of audio objects, the plurality of bed channels and the plurality of mixing parameters.

2. The computer-implemented method of claim 1, wherein generating the detection score includes:

computing the plurality of partial loudnesses, wherein the plurality of partial loudnesses includes a partial loudness of the reference audio signal, a partial loudness of the plurality of audio objects, a partial loudness of the plurality of bed channels, a partial loudness of the rendered audio signal, and a partial loudness of the channel-based audio signal.

3. The computer-implemented method of claim 1, wherein generating the detection score includes:

computing a ratio between a first energy and a second energy, wherein the first energy is an energy of the plurality of audio objects, and wherein the second energy is a sum of the energy of the plurality of audio objects and an energy of the plurality of bed channels, wherein the detection score is generated based on the ratio between the first energy and the second energy.

4. The computer-implemented method of claim 1, wherein generating the detection score includes:

computing an average position for each of the plurality of audio objects, wherein the detection score is generated based on the average position for each of the plurality of audio objects.

5. The computer-implemented method of claim 1, wherein generating the detection score includes:

computing a plurality of boost scores based on the plurality of partial loudnesses, wherein the plurality of partial loudnesses includes a partial loudness of the channel-based audio signal, a partial loudness of the reference audio signal, a partial loudness of the plurality of audio objects, and a partial loudness of the rendered audio signal; and computing a final boost score based on a sum of a largest one of the plurality of boost scores and a next-largest one of the plurality of boost scores, wherein the detection score is generated based on the final boost score.

6. The computer-implemented method of claim 5, wherein a given boost score of the plurality of boost scores comprises a product of a first value, a second value and a third value, wherein the first value is a correlation of the partial loudness between a plurality of channels of a given signal, wherein the second value is a degree of energy change in the plurality of channels of the given signal between neighboring blocks, and wherein the third value is a difference score between a plurality of loudness ratios of the plurality of channels of the given signal.

7. The computer-implemented method of claim 1, wherein generating the detection score includes:

computing a plurality of deviation metrics between a partial loudness of the rendered audio signal and a partial loudness of the reference audio signal, wherein the plurality of deviation metrics includes a deviation difference and a deviation ratio, wherein the deviation difference is a difference between a standard deviation of the partial loudness of the rendered audio signal and a standard deviation of the partial loudness of the reference audio signal, wherein the deviation ratio is based on a ratio between the standard deviation of the partial loudness of the rendered audio signal and the standard deviation of the partial loudness of the reference audio signal, and wherein the detection score is generated based on the plurality of deviation metrics.

8. The computer-implemented method of claim 1, wherein generating the detection score includes:

computing a continuity score based on a deviation difference, a deviation ratio and a boost score, wherein the deviation difference is a difference between a standard deviation of a partial loudness of the rendered audio signal and a standard deviation of a partial loudness of the reference audio signal, wherein the deviation ratio is based on a ratio between the standard deviation of the partial loudness of the rendered audio signal and the standard deviation of the partial loudness of the reference audio signal, wherein the boost score is based on a partial loudness of the channel-based audio signal, the partial loudness of the reference audio signal, a partial loudness of the plurality of audio objects, and the partial loudness of the rendered audio signal, and wherein the detection score is generated based on the continuity score.

9. The computer-implemented method of claim 8, wherein the detection score is generated based on a hyperbolic tangent function applied to a sum of a first value and a second value, wherein the first value is a product of the deviation difference and the deviation ratio, and wherein the second value is the continuity score.

10. The computer-implemented method of claim 1, wherein generating the detection score includes:

computing a weight of objects energy based on a ratio between a first energy and a second energy, wherein the first energy is an energy of the plurality of audio objects, and wherein the second energy is a sum of the energy of the plurality of audio objects and an energy of the plurality of bed channels, wherein the detection score is generated based on the weight of objects energy.

11. The computer-implemented method of claim 1, wherein generating the detection score includes:

computing a loudness weight of a partial loudness of the rendered audio signal, wherein the loudness weight increases as the partial loudness of the rendered audio signal increases, and wherein the detection score is generated based on the loudness weight.

12. The computer-implemented method of claim 1, wherein generating the detection score includes:

computing a continuity score based on a deviation difference, a deviation ratio and a boost score;

computing a weight of objects energy based on a ratio between a first energy and a second energy, wherein the first energy is an energy of the plurality of audio objects, and wherein the second energy is a sum of the energy of the plurality of audio objects and an energy of the plurality of bed channels; and computing a loudness weight of a partial loudness of the rendered audio signal, wherein the loudness weight increases as the partial loudness of the rendered audio signal increases, wherein the deviation difference is a difference between a standard deviation of a partial loudness of the rendered audio signal and a standard deviation of a partial loudness of the reference audio signal, wherein the deviation ratio is based on a ratio between the standard deviation of the partial loudness of the rendered audio signal and the standard deviation of the partial loudness of the reference audio signal, wherein the boost score is based on a partial loudness of the channel-based audio signal, the partial loudness of the reference audio signal, a partial loudness of the plurality of audio objects, and the partial loudness of the rendered audio signal, and wherein the detection score is generated based on the continuity score, the weight of objects energy and the loudness weight.

13. The computer-implemented method of claim 1, wherein generating the detection score includes:

smoothing a ratio of total loudness of the rendered audio signal, a ratio of total loudness of the reference audio signal, an energy of each of the plurality of audio objects, and a position of each of the plurality of audio objects, wherein the detection score is generated based on the ratio of total loudness of the rendered audio signal having been smoothed, the ratio of total loudness of the reference audio signal having been smoothed, the energy of each of the plurality of audio objects having been smoothed, and the position of each of the plurality of audio objects having been smoothed.

14. A non-transitory computer readable medium storing a computer program that, when executed by a processor, controls an apparatus to execute processing including the method of claim 1.

15. An apparatus for audio processing, the apparatus comprising:

a processor, wherein the processor is configured to control the apparatus to execute processing including the method of claim 1.

16. The computer-implemented method of claim 1, further comprising:

outputting, by one or more loudspeakers, a rendering of the plurality of modified audio objects and the plurality of modified bed channels as sound.

17. The computer-implemented method of claim 1, wherein the channel-based audio signal comprises a plurality of blocks, wherein a given block of the plurality of blocks comprises a plurality of samples, and wherein the detection score is generated on a per-block basis for the plurality of blocks.

18. The computer-implemented method of claim 7, wherein the detection score is generated based on a hyperbolic tangent function applied to a product of the deviation difference and the deviation ratio.

19. The computer-implemented method of claim 10, wherein the detection score is generated based on a hyperbolic tangent function applied to the weight of objects energy.

20. The apparatus of claim 19, further comprising:

one or more loudspeakers that are configured to output a rendering of the plurality of modified audio objects and the plurality of modified bed channels as sound.

* * * * *